(12) United States Patent
Quinlan

(10) Patent No.: US 10,098,286 B2
(45) Date of Patent: Oct. 16, 2018

(54) TAG RETAINER FOR A HORTICULTURAL CONTAINER

(71) Applicant: THE HC COMPANIES, INC., Twinsburg, OH (US)

(72) Inventor: Robert Quinlan, Stow, OH (US)

(73) Assignee: THE HC COMPANIES, INC., Twinsburg, OH (US)

(*) Notice: Subject to any disclaimer, the term of this patent is extended or adjusted under 35 U.S.C. 154(b) by 63 days.

(21) Appl. No.: 15/645,441

(22) Filed: Jul. 10, 2017

(65) Prior Publication Data

US 2018/0014470 A1 Jan. 18, 2018

Related U.S. Application Data

(60) Provisional application No. 62/360,409, filed on Jul. 10, 2016.

(51) Int. Cl.
*A01G 9/00* (2018.01)
*G09F 3/20* (2006.01)

(52) U.S. Cl.
CPC .............. *A01G 9/006* (2013.01); *G09F 3/206* (2013.01)

(58) Field of Classification Search
CPC . G09F 3/206; G09F 3/04; G09F 23/00; G09F 2023/0025; B65D 23/14; B65D 23/10; A01K 9/02
See application file for complete search history.

(56) References Cited

U.S. PATENT DOCUMENTS

| | | | | |
|---|---|---|---|---|
| 464,006 A * | 12/1891 | Brunell | ................... | G09F 3/202 40/490 |
| 2,895,448 A * | 7/1959 | Haines | ................... | B42F 21/10 116/324 |
| 3,692,202 A * | 9/1972 | Parlagreco | ......... | A47G 23/0266 215/398 |
| 3,991,495 A * | 11/1976 | Wilson | ..................... | G09F 7/00 40/375 |
| 4,516,687 A * | 5/1985 | Taguchi | ................ | A47J 45/067 215/395 |
| 7,325,510 B2 * | 2/2008 | Giewercer | ................ | A61J 7/04 116/308 |
| 7,610,707 B1 * | 11/2009 | Payne | ................... | B42F 21/065 283/36 |
| 8,875,428 B2 * | 11/2014 | Rowe | ..................... | B42F 21/10 40/641 |
| 2007/0119082 A1 * | 5/2007 | Gilchrist | ................. | B42F 21/06 40/641 |

* cited by examiner

*Primary Examiner* — Cassandra Davis
(74) *Attorney, Agent, or Firm* — Tucker Ellis LLP

(57) ABSTRACT

Provided is a tag retaining system for use with a container. The tag retaining system includes a tag retainer having a front surface and a back surface. The back surface has a middle portion interposed between first and second side portions. The first and second side portions have adhesive thereon for mounting to a surface of a container. The middle portion is free of adhesive to form a tag opening between the surface of the container and the middle portion and the tag opening receives a tag therein.

13 Claims, 5 Drawing Sheets

TAG RETAINER FOR A HORTICULTURAL CONTAINER

RELATED APPLICATIONS

This application claims the benefit of U.S. Provisional Application No. 62/360,409 filed Jul. 10, 2016, which is hereby incorporated herein by reference.

FIELD OF INVENTION

The present invention relates generally to tag retainers, and more particularly to tag retainers used with containers.

BACKGROUND

Plants are often sold in pre-planted arrangements in horticultural containers, such as planters and hanging baskets. The identification of the type or types of plants in a container as well as care or growing instructions may be printed on a tag that is hung from a slot in the container. The slot may be present in an upper rim of the container and a portion of the tag is inserted upwardly or downwardly through the slot such that the main body of the tag with the printed information hangs adjacent the sidewall of the container or above the upper rim.

Different types of plants or different planter sizes may be sold at different prices. The pricing information for a container and its associated plants may be printed on the tag in one or more forms, such as a price readable by persons, SKU information, a bar code readable by a scanner of a point of sale terminal, etc. Unfortunately, it has been found that unscrupulous customers may remove the tag from a desired container of plants and from a less expensive container of plants, and insert the tag having the lower price information into the tag slot of the more expensive desired container of plants. The less expensive container of plants may then be left without a tag or with an incorrect tag if the customer places the tag from the desired container into the tag slot of the less expensive container.

SUMMARY OF INVENTION

The present application provides a tag retaining system. The tag retaining system includes a tag retainer and a tag. The tag retainer has a front surface and a back surface. The back surface has a middle portion interposed between first and second side portions. The first and second side portions have adhesive thereon for mounting to a surface of a container. The middle portion is free of adhesive to form a tag opening between the surface of the container and the middle portion.

In an embodiment, the tag retainer system includes a container having a wall surface, a tag retainer and a tag. The tag retainer includes a front surface and a back surface. The back surface has a middle portion interposed between first and second side portions that have adhesive and are mounted by the adhesive to the wall surface of the container. The middle portion is free of adhesive to form a tag opening between the wall surface of the container and the middle portion. The tag includes a body, a head portion having a first ear and a second ear on opposite sides thereof, and a neck portion that connects the body portion to the head portion. The neck portion is disposed in the tag opening while the body extends outside of a first end of the tag opening, and the head portion extends outside of a second end of the tag opening such that the ears radially overlap the front surface of the tag retainer.

In an embodiment, the tag retainer has a front surface and a back surface. The back surface has a middle portion interposed between first and second side portions. The first and second side portions have adhesive and the middle portion is free of adhesive. At least one of the front surface or the back surface has a first score where the middle portion meets the first side portion and a second score where the middle portion meets the second side portion.

The foregoing and other features of the application are described below with reference to the drawings.

DETAILED DESCRIPTION

The principles of the present application relate to a tag retaining system for use with a horticultural container, such as a pot, planter, etc., and thus will be described below in this context. It will be appreciated that the principles of the application may be applicable to a tag retaining system for other suitable containers.

Figure 1:
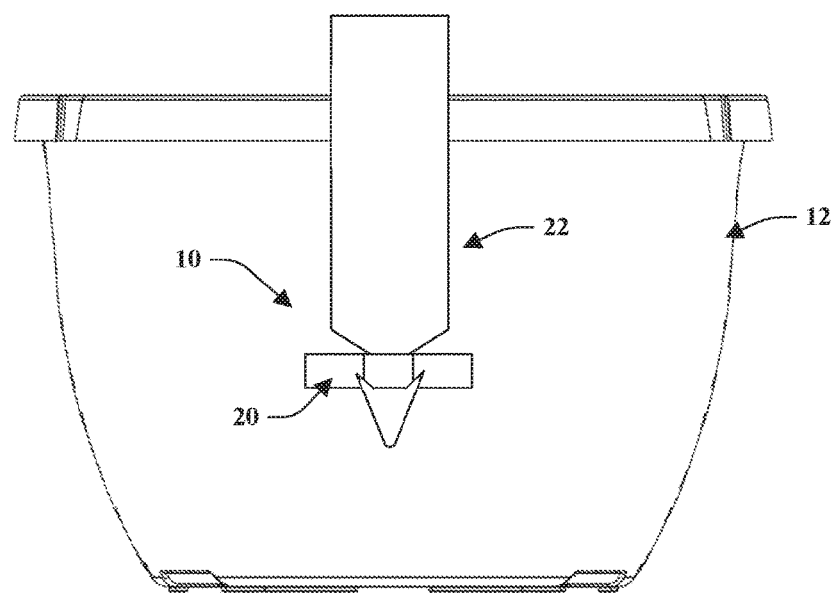
FIG. 1 illustrates a horticultural container with an exemplary tag retaining system.

Turning now to FIG. 1, depicted is an exemplary tag retaining system 10 attached to a horticultural container 12. The tag retaining system 10 includes a tag retainer 20 adhered to the container 12 and a tag 22. The tag retainer 20 can be any suitable shape, such as generally rectangular in shape with a suitable thickness, such as a thickness similar to that of a strip of tape. The tag 22 is shown as an upwardly extending tag, with the body of the tag extending above the tag retainer 20, although it will be appreciated that the tag 22 may also be downwardly extending.

Figure 2:
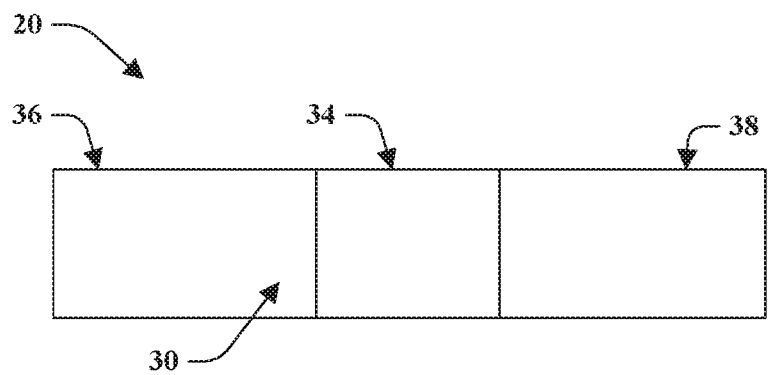
FIG. 2 illustrates a front view of an exemplary tag retainer.
Figure 3:
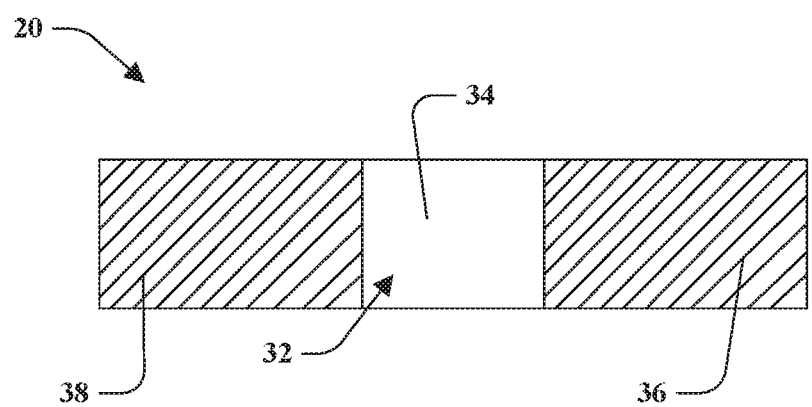
FIG. 3 illustrates a rear view of an exemplary tag retainer.

Turning now to FIGS. 2 and 3, the tag retainer 20 includes a front surface 30 shown in FIG. 2 that faces away from the container 12 and a back surface 32 shown in FIG. 3 that faces toward the container 12. The back surface 32 includes a middle portion 34 interposed between a first side portion 36 and a second side portion 38. The first side portion 36 and second side portion 38 can have a suitable adhesive thereon for mounting to a surface of the container 12 while the middle portion 34 is free of adhesive. When the tag retainer 20 is mounted to the surface of the container 12, the middle portion 34 forms a tag opening between the surface of the container 12 and the middle portion 34.

The tag retainer 20 can be constructed from a material that is water resistant to withstand the regular watering of plants contained within an associated container, such as paper, wax-paper, plastic, Mylar tape, etc. The adhesive material on the first side portion 36 and second side portion 38 of the tag retainer 20 may be a suitable water resistant adhesive, epoxy, or other bonding agent, that may be high-tack and/or pressure-sensitive.

Figure 4:
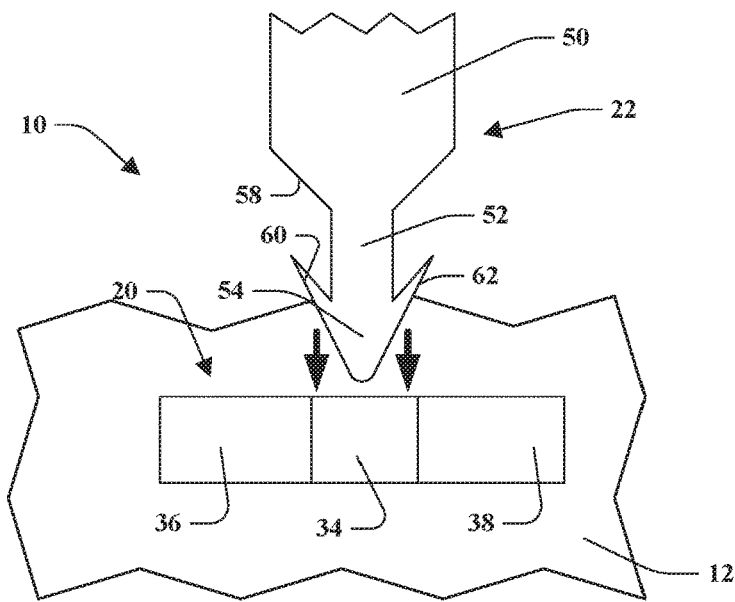
FIG. 4 illustrates an embodiment of the tag retaining system.
Figure 5:
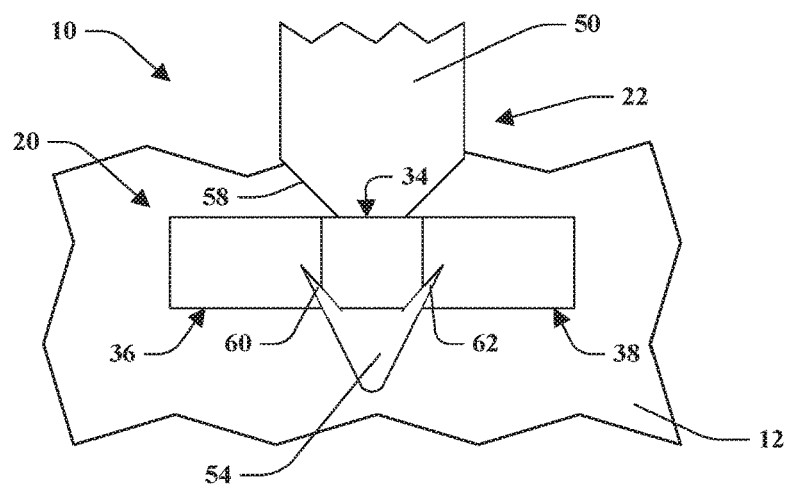
FIG. 5 illustrates an embodiment of the tag retaining system with the tag disposed within the tag retainer.

Turning now to FIGS. 4 and 5, the tag 22 includes a body 50, a neck portion 52 connected to the body 50, and a head portion 54 connected to the neck portion 52. In the illustrated embodiment, the body 50, neck portion 52, and head portion 54 are of unitary construction. The body 50 forms a surface for indicia, such as one or more of an identification of contents of the container 12, price of the container 12, contents of the container 12, care or grow information pertaining to the contents of the container 12, etc. The neck portion 52 has a width that fits in the tag opening and a length that is established such that, after insertion of the head 54 through the tag opening, the tag 22 becomes trapped by the tag retainer 20. In certain embodiments, the neck portion 52 extends from shoulders 58 that form a sloped connection between the neck portion 52 and the body 50. The head portion 54 has a first ear 60 and a second ear 62 on opposite sides thereof. As illustrated, a width of the head portion 54 from the first ear 60 to the second ear 62 is wider than the width of middle portion 34 of tag retainer. At least the first ear 60 and second ear 62 can be made of a flexible material such that the ears can be slightly bent or biased in a direction away from the surface of the container 12 when installed.

To install the tag 22 in the tag opening formed between the container 12 and the tag retainer 20, the head portion 54 is inserted into the tag opening as shown in FIG. 4. As downward force is applied, the head portion 54 bends to fit through the tag opening and continues through the tag opening until the tag 22 is in a position where the neck portion 52 is disposed within the tag opening as shown in FIG. 5. In this position, the body 50 extends outside of the top end of the tag opening and the head portion 54 extends outside of the bottom end of the tag opening such that the ears 60 and 62 radially overlap the front surface of the tag retainer 20 and engage a bottom of the tag retainer 20 to resist removal of the tag 22. If additional downward force is applied to the tag 22, the shoulders 58 will engage the top edge of the tag retainer 20 to prevent further downward movement of the tag 22. If too much downward force is applied, the tag shoulders 58 may cut into the tag retainer 20 or cause the tag retainer 20 to separate from the surface of the container 12. While FIGS. 4 and 5 depict the tag 22 being inserted using a downward force, it should be appreciated that the tag 22 could be inserted using an upward force or the tag retainer 20 oriented and applied such that the tag 22 can be inserted using a side force.

When the tag 22 is in the inserted position, the first and second ears 60 and 62 of the tag 22 can be slightly biased in an outward direction away from the surface of the container 12 so that the ears 60 and 62 prevent the tag 22 from being easily removed from the tag retainer 20. Upon insertion, the ears 60 and 62 tend to overlap the bottom edge of the tag retainer 20 and become hooked over the bottom edge and front surface of the tag retainer 20. Alternatively, a user can slightly bend the ears 60 and 62 into an appropriate position to facilitate hooking the bottom edge of the tag retainer 20. Therefore, once the tag 22 is inserted into the tag opening, if sufficient upward force is applied to the tag 22 in an attempt to remove the tag 22 by pulling, then the tag retainer 20 may tear or break due to the force exerted by the ears 60 and 62. In this case, the tag retainer 20 would not be reusable with another tag 22. Alternatively, one or both of the ears 60 and 62 may shear off the tag 22, rendering the tag 22 not reusable with another container. It is also possible that the tag 22 may cut into the tag retainer 20 or cause the tag retainer 20 to separate from the surface of the container 12. However, after a consumer has purchased the container and would like to display the container, the tag 106 may be removed in this manner or may be cut off with a knife or scissors.

In one embodiment, the material is chosen such that the tag retainer 20 is not as strong as the tag 22. This is so that when a person provides an upward or downward force in an attempt to remove the tag 106, the tag retainer 20 rips or breaks instead of the tag 22 ripping or breaking. In another embodiment, the material is chosen such that the tag retainer 20 is stronger than the tag 22 so that the tag 22 breaks rather than the tag retainer 20.

Figure 6:
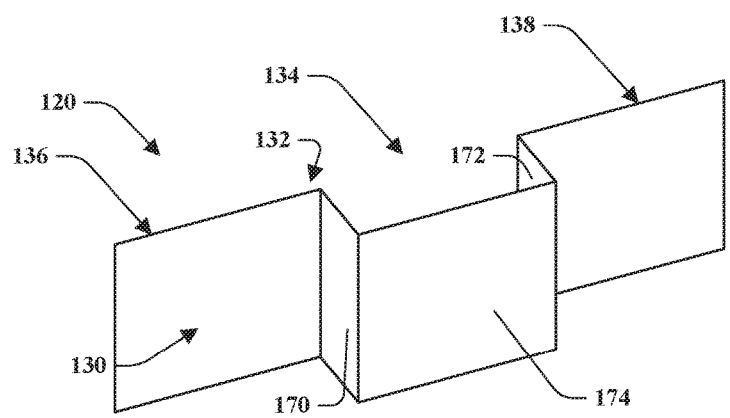
FIG. 6 illustrates an embodiment of a tag retainer.

Turning now to FIG. 6, an exemplary embodiment of the tag retainer is shown at 120. The tag retainer 120 is substantially the same as the above-referenced tag retainer 20, and consequently the same reference numerals but indexed by 100 are used to denote structures corresponding to similar structures in the tag retainers. In addition, the foregoing description of the tag retainer 20 is equally applicable to the tag retainer 120 except as noted below.

The tag retainer 120 includes a back surface 132 having a middle portion 134 interposed between a first side portion 136 and a second side portion 138. The first side portion 136 and second side portion 138 can have a suitable adhesive thereon. The middle portion 134 comprises two generally rectangular sidewalls 170 and 172, and a middle face 174. This arrangement creates a deeper tag opening, facilitating insertion of the tag head 54 into the tag opening. When attached to the container 12, the top edge of the middle face 174 is approximately the same distance from the surface of the container 12 as the bottom edge of the middle face 174. It should be appreciated that the depth of the tag opening can be varied depending on the width of the rectangular sidewalls 170 and 172. The depth of the tag opening can be chosen so that it is deep enough to allow simple insertion of the tag 22, but not so deep that the tag 22 droops or stands at a significant angle to the container 12 surface. The tag retainer 120 supports and secures the tag 22 in such a manner that the tag 22 stands generally straight and rigid.

Figure 7:
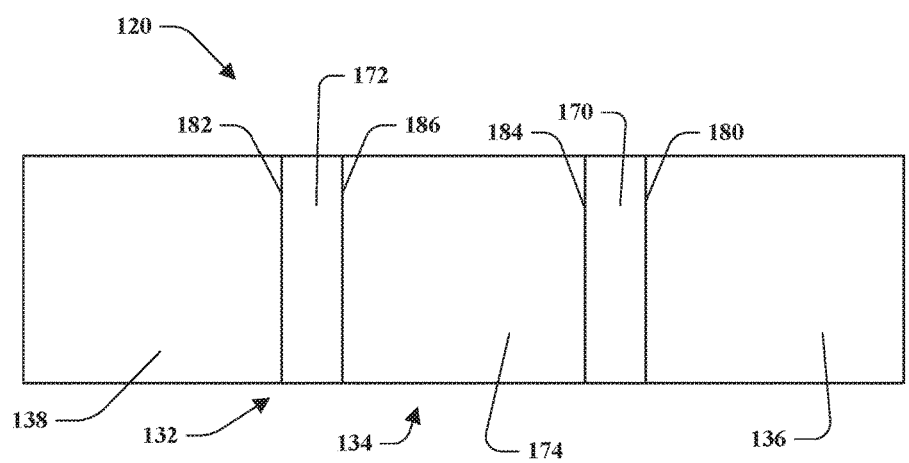
FIG. 7 illustrates the tag retainer depicted in FIG. 4 before being folded.

As shown in FIG. 7, before application, the tag retainer 120 can be pre-folded or pre-scored in a way that corresponds to the folds necessary to create the middle portion 134. Alternatively, the tag retainer 120 can be manually scored or folded upon application. As shown, either the front surface 130, back surface 132, or both has a total of four score marks. A first score mark 180 is located where the middle portion 134 meets the first side portion 136, a second score mark 182 is located where the middle portion 134 meets the second side portion 138, and third and fourth score marks 184 and 186 are located in-between the first score mark 180 and the second score mark 182. It should be appreciated that the score marks can be placed in different locations and at different angles depending on the desired shape and embodiment of the tag retainer.

Prior to application to the surface of the container 12, the tag retainer 120 may lie flat on a roll or web of material. The tag retainer 120 may be applied to a surface of a container 12 directly from a roll using a transfer process, which may be automated. In this instance, the two adhesive portions of the tag retainer 120 on the back surface of the first and second side portions 136 and 138 may be treated as individual labels or stickers for proper placement on the container. Alternatively, the tag retainers 120 may be applied to a container's surface 12 using a "pick and place" method. In this method, the tag retainer 120 is removed from a backing manually or automatically by machine, and individually placed in the proper location on the surface of the container 12.

Figure 8:
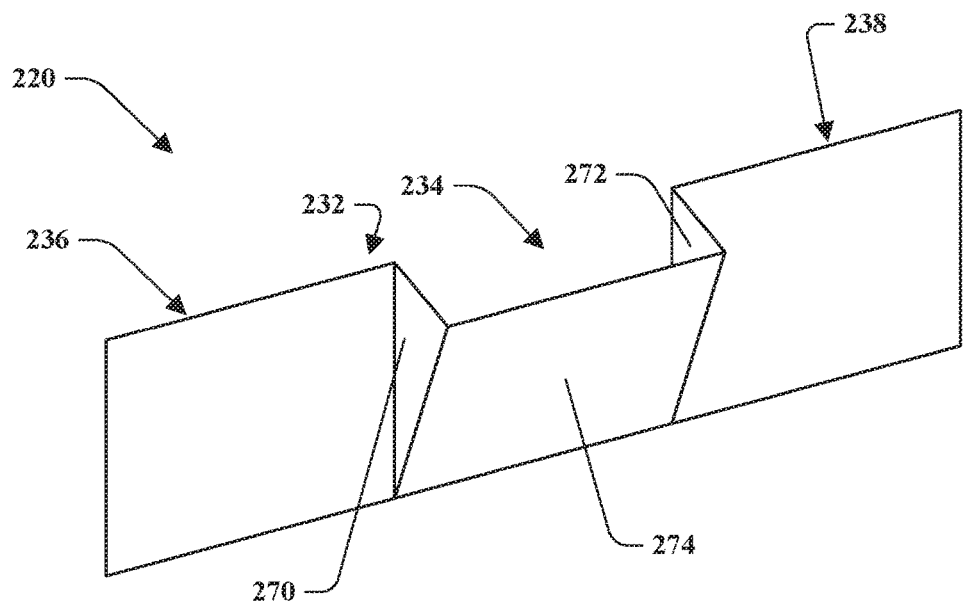
FIG. 8 illustrates another embodiment of a tag retainer.

Turning now to FIG. 8, an exemplary embodiment of the tag retainer is shown at 220. The tag retainer 220 is substantially the same as the above-referenced tag retainer 120, and consequently the same reference numerals but indexed by 100 are used to denote structures corresponding to similar structures in the tag retainer 220. In addition, the foregoing description of the tag retainer 120 is equally applicable to the tag retainer 220 except as noted below.

The tag retainer 220 includes a back surface 232 having a middle portion 234 interposed between a first side portion 236 and a second side portion 238. The first side portion 236 and second side portion 238 can have a suitable adhesive thereon. The middle portion 234 comprises two sidewalls 270 and 272, and a middle face 274. The distance from a top edge of the middle face 274 of tag retainer 220 to the surface of the container 12 is greater than a distance from the bottom edge of the middle face 274 to the surface of the container 12 such that the middle face 274 slopes toward the surface of the container 12 from top to bottom. This feature provides a larger gap for the head portion 54 and facilitates insertion of the head portion 54 of the tag 22 into the tag opening created by the middle portion 234 of tag retainer 220. In this embodiment, the sidewalls 270 and 272 can be either triangular or trapezoidal.

Figure 9:
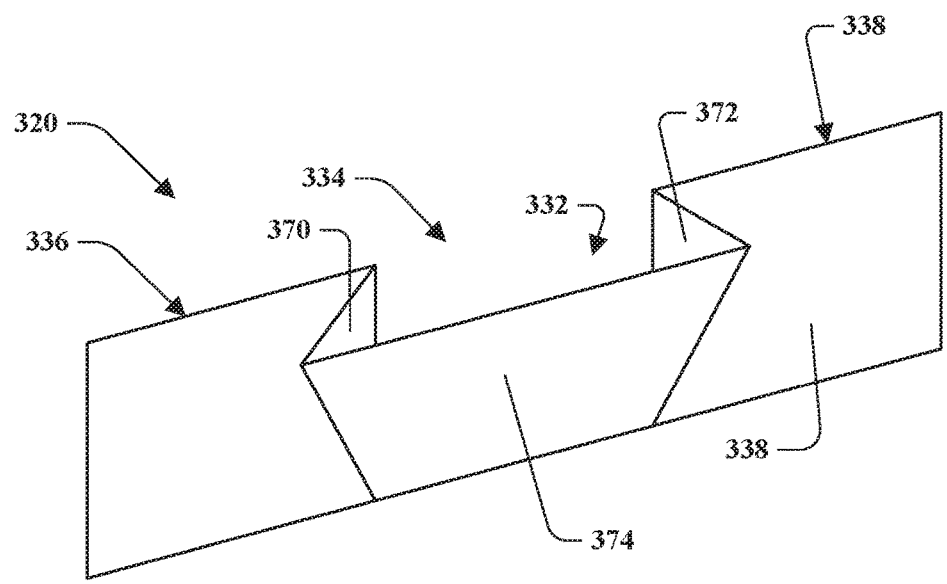
FIG. 9 illustrates another embodiment of a tag retainer.

Turning now to FIG. 9, an exemplary embodiment of the tag retainer is shown at 320. The tag retainer 320 is substantially the same as the above-referenced tag retainer 220, and consequently the same reference numerals but indexed by 100 are used to denote structures corresponding to similar structures in the tag retainer 320. In addition, the foregoing description of the tag retainer 220 is equally applicable to the tag retainer 320 except as noted below.

The tag retainer 320 includes a back surface 332 having a middle portion 334 interposed between a first side portion 336 and a second side portion 338. The first side portion 336 and second side portion 338 can have a suitable adhesive thereon. The middle portion 334 comprises two sidewalls 370 and 372, and a middle face 374. A top edge of the middle face 374 of tag retainer 320 is wider than a bottom edge of middle face 374. The tag opening gradually narrows in width from an entry end or first end of the tag opening at the top of the tag retainer to a second end of the tag opening at the bottom of the tag retainer. This feature facilitates insertion of the head portion 54 of the tag 22 into the tag opening created by the middle portion 334 of tag retainer 320. The shape of the tag opening in this embodiment helps guide the tag 22 into the tag retainer 320. The sidewalls 370 and 372 can be either triangular or trapezoidal.

Although certain embodiments have been shown and described, it is understood that equivalents and modifications falling within the scope of the appended claims will occur to others who are skilled in the art upon the reading and understanding of this specification.

What is claimed is:

1. A tag retaining system comprising:
    a tag retainer having a front surface and a back surface, the back surface having a middle portion interposed between first and second side portions, wherein the first and second side portions have adhesive thereon for mounting to a surface of a container and the middle portion is free of adhesive to form a tag opening between the surface of the container and the middle portion; and
    a tag configured to be received in the tag opening,
    wherein the middle portion comprises a middle face and two sidewalls extending from opposite sides of the middle face generally perpendicular to the middle face,
    wherein a width of each sidewall defines a distance of the middle face from the surface of the container when attached to the container, and
    wherein the two sidewalls are generally triangular or trapezoidal in shape such that the first end of the tag opening is further from the surface of the container than the second end of the tag opening when attached to the container.

2. The tag retaining system of claim 1, wherein the tag comprises:
    a body;
    a head portion having a first ear and a second ear on opposite sides thereof; and
    a neck portion connecting the body portion to the head portion,
    wherein the neck portion is configured to be disposed in the tag opening, the body is configured to extend outside of a first end of the tag opening, and the head portion is configured to extend outside of a second end of the tag opening such that the ears radially overlap the front surface of the tag retainer.

3. The tag retaining system of claim 2, wherein a width of the head portion from first ear to second ear is wider than a width of the tag opening.

4. The tag retaining system of claim 2, wherein the neck portion extends from two shoulders that form opposing sloped connections between the neck portion and the body.

5. The tag retaining system of claim 2, wherein the body of the tag has a width that is wider than a width of the tag opening.

6. The tag retaining system of claim 2, wherein the ears are biased in a direction away from the surface of the container.

7. The tag retaining system of claim 2, wherein the ears bend inwards as the head portion is inserted into the tag opening.

8. The tag retaining system of claim 1, wherein the first end of the tag opening is wider than the second end of the tag opening such that the tag opening gradually narrows from the first end of the tag opening to the second end of the tag opening.

9. A tag retaining system comprising:
    a container having a surface;
    a tag retainer having a front surface and a back surface, the back surface having a middle portion interposed between first and second side portions, wherein the first and second side portions have adhesive and are mounted by the adhesive to the surface of the container, and the middle portion is free of adhesive to form a tag opening between the surface of the container and the middle portion; and
    a tag comprising:
    a body;
    a head portion having a first ear and a second ear on opposite sides thereof; and a neck portion connecting the body portion to the head portion,
    wherein the neck portion is disposed in the tag opening, the body extends outside of a first end of the tag opening, and the head portion extends outside of a second end of the tag opening such that the ears radially overlap the front surface of the tag retainer,
    wherein the middle portion comprises a middle face and two sidewalls extending from opposite sides of the middle face generally perpendicular to the middle face, wherein a width of each sidewall defines a distance of the middle face from the surface of the container when attached to the container, and wherein the two sidewalls are generally triangular or trapezoidal in shape such that the first end of the tag opening is further from the surface of the container than the second end of the tag opening when attached to the container.

10. The tag retaining system of claim 9, wherein the neck portion extends from two shoulders that form opposing sloped connections between the neck portion and the body.

11. The tag retaining system of claim 10, wherein the two shoulders each form a sloped surface that make contact with the first end of the tag opening.

12. The tag retaining system of claim 10, wherein a shoulder width is wider than the tag opening such that contact of the two shoulders with the tag retainer restricts removal of the tag from the tag retainer in a first direction.

13. The tag retaining system of claim 12, wherein contact of the ears with the tag retainer restricts removal of the tag from the tag retainer in a second direction opposite the first direction.

* * * * *